June 5, 1951   B. AMES   2,555,668
ELECTRIC ROOM HEATER
Filed April 19, 1949
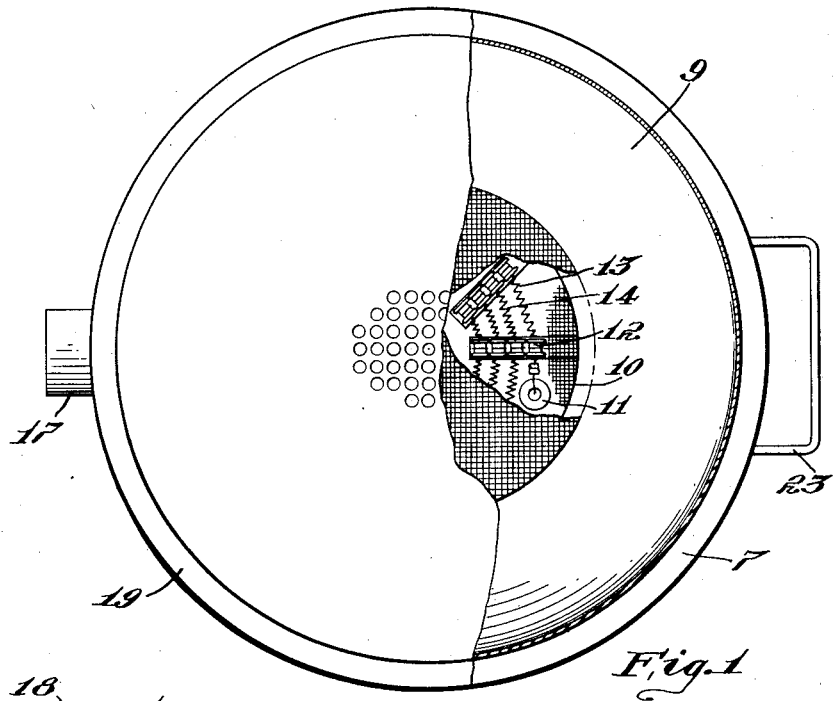
Fig.1
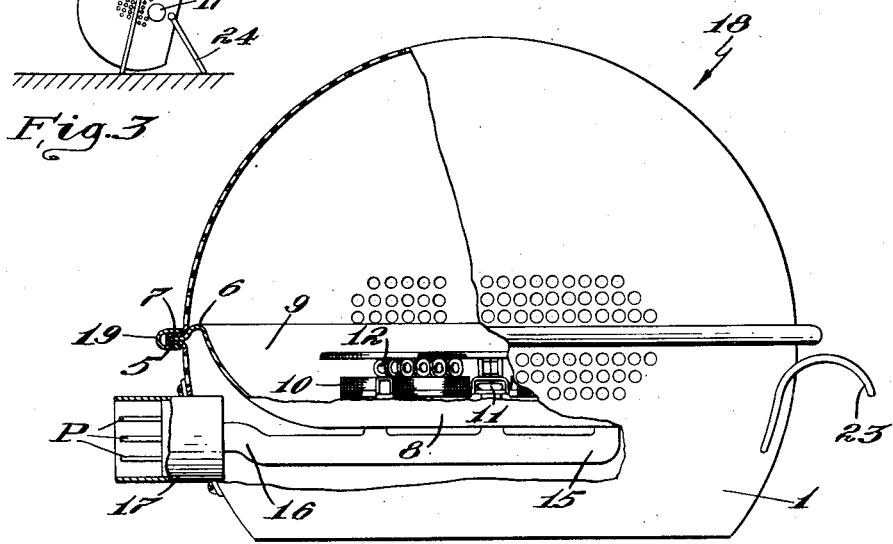
Fig.3
Fig.2
Inventor
Butler Ames
by Roberts Cushman Grover
att'ys.

Patented June 5, 1951

2,555,668

UNITED STATES PATENT OFFICE 2,555,668

ELECTRIC ROOM HEATER

Butler Ames, Boston, Mass.

Application April 19, 1949, Serial No. 88,323

1 Claim. (Cl. 219—34)

This invention relates to portable, electrically energized room heaters. One of the objects of the invention is to provide a portable heater which may be supplied with electrical energy from any usual lighting circuit. A further object is to provide a heater which is highly efficient in operation and which emits heat energy of substantially uniform intensity throughout a spherical arc of at least 180°. A further object is to provide an electrical heater which is light in weight, simple and inexpensive in construction and which is durable and capable of withstanding rough usage. A further object is to provide a portable heater which, when energized, glows throughout its entire exposed peripheral surface. A further object is to provide an electrical heater which is safe to use even for such purposes as for warming beds, its heating unit being so enclosed as to prevent it from coming into such near proximity to external objects as to cause injury to the latter or to set fire to inflammable materials. A further object is to provide a portable heater which may be used in various positions, for example, resting upon the floor or other horizontal surface, or suspended from a hook or the like. A further object is to provide a portable heater capable of emitting energy at various selected rates but which does not require a switch or rheostat for varying the rate of heat emission. A further object is to provide a portable heater of pleasing and decorative external appearance and which is acceptable for use in substantially any surroundings. Other and further objects and advantages of the invention will be pointed out in the following more detailed description and by reference to the accompanying drawings wherein:

Fig. 1 is a plan view of the heater of the present invention, a portion being in horizontal section to show the interior construction;

Fig. 2 is a side elevation, partly in vertical, diametrical section substantially on the line 2—2 of Fig. 1; and Fig. 3 is a side elevation, to smaller scale, showing the heater standing on edge.

Referring to the drawings, the improved heater of the present invention comprises the base 1 (Fig. 2) preferably having a substantially flat bottom 2 designed to rest upon the floor or other suitable surface. If desired, the base may have supporting legs fixed to the flat bottom 2, such legs being of any desired material, for example a synthetic resin. However, such legs are not ordinarily necessary. The side wall 3 of the base is preferably of spherical curvature. While for aesthetic reasons the side wall of the base is of spherical curvature as suggested, particularly when the cover, hereinafter described, is of spherical curvature, it is contemplated that the side wall of the base may be of other than spherical curvature, for example, parabolic or even conical. In horizontal section, as shown, the base 1 is circular. The side wall of the base is of perforated sheet material. For example, the entire base may be made from a unitary disk of stainless steel. However, if desired, the central portion (intended to form the bottom 2) may be imperforate. The side walls at least of the base are perforated with small holes of any desired shape, for example, circular, hexagonal or the like, the holes desirably being arranged in regular order, for instance, in concentric circles for the sake of appearance and in order to insure uniformity of stretching when the material is subjected to the shaping operation. This disk, having thus been prepared, is shaped to form the base 1 as shown in Figs. 1 and 2, for example, by spinning or by pressure in suitably shaped dies. As illustrated, the upper margin of the side wall 3 of the base is turned outwardly to form a substantial horizontal flange or lip 5.

As herein illustrated, the support for the heating unit is a shallow, basin-like member 6 having a marginal flange 7 which rests upon the flange 5 of the base. The support 6 has a central or bottom portion 8 and a curved side wall 9 which may be of circular or parabolic curvature. This support 6 is of sheet metal, for example, stainless steel, and its inner surface is highly polished so that it acts as a reflector. If desired, the support 6 may be of perforated metal but the reflecting surface is thereby diminished.

The heating unit is mounted on the central or bottom portion 8 of the support 6. Preferably this heating unit is designed to emit visible radiant energy near the red end of the spectrum. This heating unit preferably comprises a substantially circular plate or disk 10 made of a fine mesh wire screen and is mounted upon the central portion of the support 6 so as to support the heating elements substantially at the focal point of the curved inner surface of the wall 9 of the support. The disk 10 rests upon a plurality of spaced, refractory insulating spools or grommets 11, one of which is preferably situated centrally of the support, and the others of which are located near the margin of the disk 10. The disk 10 is perforated for the reception of the grommets 11 and is secured to the grommets in any suitable way, for example, by pressing the mesh wires of the disk 10 (bordering the holes which receive the spools) into initimate engagement with the midportions of the spools. The fine wire mesh forming the disk 10 is preferably made of stainless steel or other material which will withstand a heat of the order of 1800° F. This disk 10 is sprayed with Alundum or some other highly refractory cement which is baked on at a temperature of approximately 1800° F. The material of the wire must be such as to have a low coefficient of thermal expansion approximating that of the coating so that the latter will not crack in response to heating and cooling. The lower end of each of the spool-like supports 11 rests on and is fastened to the central portion or bottom of the support 6.

Insulating spools or grommets 12 rest upon the upper surface of the disk 10. These spools or grommets 12 are preferably of porcelain or other refractory material which is an insulator of electricity. These spools are disposed with their axes parallel to the plane of the disk 10 and so that their axes are substantially perpendicular to radii of the disk. These spools are fastened securely to the disk 10 by fine wires, for example, of stainless steel which are wrapped about the barrels or midportions of the spools and fastened to the wires constituting the disk 10. These spools or grommets 12 constitute insulating supports for a pair of resistance wires 13 and 14. These wires are arranged to form coaxial resistance coils of respectively different heating capacities, one nested inside the other, the ends of the two coils passing downwardly through certain of the insulating supports 11 and through insulated openings in the bottom 8 of the support 6, and are then connected to suitable insulated lead wires housed within a tubular member 15 underlying the central part of the support 6 and having its left-hand end 16 (Fig. 2) fixed in a receptacle 17 which in turn is secured rigidly in an opening in the side wall 3 of the base of the heater. Preferably, the receptacle 17 is of the kind having more than two posts P designed to enter corresponding sockets in a plug at the end of a conductor cord. The posts may be fitted into the plug sockets in various ways so as to supply current to energize one or both of the coils 13 and 14. By using a receptacle of this type, having the terminals of the coils 13 and 14 suitably connected to its several posts, it is possible merely by inserting the plug in the proper way into the receptacle to provide, for example, three degrees of heat without the use of a special switch or rheostat.

The cover 18 of the heater comprises a unitary piece of sheet metal, for example, stainless steel, which is stiff and rigid and resistant to oxidation or other injury resultant from exposure to glowing radiant energy. For example, the cover may be made from a unitary disk of the selected material, for instance stainless steel, which is perforated all over, the perforations being arranged in regular order, for instance, in concentric circles, and of any appropriate size and shape, for example, hexagons or circules of one-quarter inch diameter. Preferably, these perforations in the cover are of the same size and shape as those in the wall 3 of the base. The perforated disk from which the cover is made is subjected to a spinning or die-pressing operation so as to conform it to the desired contour. As illustrated, this cover is substantially hemispherical, the center of curvature being at the same point as that of the side wall of the base, so that when the cover is assembled with the base the external configuration of the entire case or housing for the heating element approximates that of a sphere, or, more exactly, a major segment of a sphere. As illustrated, the lower edge of the cover 18 has a substantially horizontal flange 19 directed outwardly and which rests upon the flange 7 of the support 6. While the flanges 5, 7 and 19 may be united by other means, for example, by screws or bolts, it is preferred, for simplicity and to reduce the cost of construction, to extend the flange 19 downwardly and about the edges of the flanges 7 and 5 and beneath the flange 5 so that the extended portion of the flange 19 embraces the flanges 5 and 7 and thus locks the parts together. While the cover 18 is desirably of spherical curvature, it is understood that the cover may be of other curvature, for example, parabolic or even conical within the general purview of the invention.

To facilitate handling the heater, a handle 23, preferably of stainless steel, is secured to the base 1 at a point diametrically opposite to the receptacle 17. Desirably this handle 23 is of the shape shown in Fig. 2 so that the handle may be readily employed for suspending the heater in a position such that the axis of the reflecting cone 20 is substantially horizontal.

As illustrated in Fig. 3, the base may be provided with a hinged brace or prop 24, preferably a length of bent, stiff wire, by means of which the heater may be supported in inclined position. This brace or prop may also be used for suspending the heater from an elevated support, and, if this brace be provided, the hook 23 may be omitted.

The outer surfaces of the wall 3 of the base and the cover 18 are preferably polished, that is to say, highly reflecting. Likewise the inner surface of the curved portion 9 of the support 6 and the inner surface of the cover are preferably highly polished and mirror-like, and, if stainless steel is employed, the bounding walls of the perforations will also be bright and reflecting.

As thus constructed, and when one or both of the heating coils 13 or 14 is energized, the coils emit glowing radiant energy which is reflected back and forth between the inner surface of the curved wall 9 and the inner surface of the cover 18 and passes out radially through the perforations in the cover. Due to the internal reflections, the device, when viewed in a darkened room, appears to glow with a ruddy, orange hue throughout its entire peripheral extent, appearing like a ball of fire, the energy which passes out through the perforations apparently being of a wave length approximating that of the red or infrared end of the spectrum. However, due to the material employed (stainless steel or the like), the cover does not become highly heated. The radiant energy passes out through the perforations in the cover and warms outside objects by radiation. It is found that the heat radiating from the apparatus is of substantially the same intensity at any given radial distance from the center of curvature of the cover, that is to say, over the entire area of any geometric hemispherical shell concentric with the center of curvature, and the temperature is substantially the same.

Since radiant energy is directed horizontally out through the lower part of the cover, the device is very effective for heating even the lower part of a room when the device is set on a floor. In this connection it may be noted that the height of the flange 5 from the floor, when the device is resting on the floor, is approximately three and one-half inches, and thus heat emitted at this level and directed horizontally is effective for warming even the feet of occupants of the room. When the device is suspended by the handle 23 it is effective for heating at a higher level, but since the heat, as above noted, is distributed radially over a spherical surface, the heat is effective for warming a compartment of substantial dimensions. The perforations in the base permit free circulation of air through the space beneath the support 6, thus avoiding overheating of the support and provide for the effective distribution of heat near the floor level.

By reason of its shape and its pleasing appearance, whether in use or not, the device is acceptable as an article of room furniture in almost any surroundings, having but little suggestion of the mechanical and when energized constituting a highly ornamental and pleasing center of interest.

While one desirable embodiment of the invention has been illustrated and described by way of example, it is to be understood that the invention is broadly inclusive of any and all modifications falling within the scope of the appended claim.

I claim:

A portable, electrically energized room heater having a case which is externally shaped substantially like a major segment of a sphere and which comprises a base having a substantially flat bottom surface and a curved side wall having a marginal flange at its upper edge, a basin-like support having a highly polished inner surface arranged within the base and having a marginal flange resting upon the marginal flange of the side wall of the base said basin-like support having a flat bottom spaced above and parallel to that of the base affording a chamber between the flat bottom of the basin and the base, a source of glowing radiant energy carried by the support, said source of energy comprising coaxial resistance coils arranged in a plane parallel to that of the flat bottom of the basin, the support having side walls which are curved and which constitute a reflector for reflecting heat energy emitted by the source, and a substantially hemispherical cover having at its lower edge a resilient U-shaped flange embracing the marginal flanges of the basin and the base, said cover being of perforated stainless steel and having a polished inner surface, means for supplying electrical current to the energy source comprising electrical conductors arranged within said chamber between the bottom of the basin and the base, and an electric receptacle fixed to one side of the base designed to receive a plug at the end of a flexible conductor cord, said electric receptacle being connected to the conductors within the base and said conductors being readily accessible by lifting the basin from the base, and a bail-like brace hinged to the base along a diameter substantially parallel to the axis of the electric receptacle which may be arranged to engage the floor to hold the base inclined to the horizontal with the rim resting on the floor and which may be arranged substantially parallel to the bottom to suspend the base with its bottom flat against a vertical surface.

BUTLER AMES.

REFERENCES CITED

The following references are of record in the file of this patent:

UNITED STATES PATENTS

| Number | Name | Date |
|---|---|---|
| 606,792 | Ouidas | July 5, 1898 |
| 1,374,591 | Lightfoot | Apr. 12, 1921 |
| 1,659,278 | Meltzer et al. | Feb. 14, 1928 |
| 2,486,309 | McIntosh | Oct. 25, 1949 |

FOREIGN PATENTS

| Number | Country | Date |
|---|---|---|
| 237,938 | Switzerland | Sept. 17, 1945 |